United States Patent [19]

Fleming

[11] Patent Number: 4,830,375

[45] Date of Patent: May 16, 1989

[54] BINGO CHIP DISPENSER

[76] Inventor: William Fleming, 11 Karen's Way, Berkley, Mass. 02780

[21] Appl. No.: 177,381

[22] Filed: Apr. 4, 1988

[51] Int. Cl.[4] ........................ B65D 83/04; B65G 59/06

[52] U.S. Cl. .................................... 273/148 R; 453/43

[58] Field of Search ............... 273/148 R; 453/43, 44, 453/45, 46, 47, 48, 50, 51, 52, 53, 54

[56] References Cited

U.S. PATENT DOCUMENTS 4,216,878 8/1980 Naud ................................. 453/44 X
4,392,505 7/1983 Maloney et al. ...................... 453/40
4,413,750 11/1983 Marrone et al. .................. 453/49 X

*Primary Examiner*—Anton O. Oechsle
*Attorney, Agent, or Firm*—William Nitkin

[57] ABSTRACT

A bingo chip dispensing device having a body with a cartridge receipt area for attachment of a cartridge containing bingo chips. The chips feed into a chip receipt area in the body where one is retained between the arms of a slide member. When the arms are moved forward by depressing a knob, the bingo chip drops from the body member through a deposit nozzle onto a selected spot on a bingo card.

3 Claims, 2 Drawing Sheets

BINGO CHIP DISPENSER

BACKGROUND OF THE INVENTION

1. Field of the Invention

The field of this invention resides in the area of bingo chip dispensers and more particularly relates to a hand-operated dispenser which can deposit a single bingo chip over a particular numbered square on a bingo card when that number is called during the course of a bingo game.

2. Description of the Prior Art

To play the game of bingo, circular chips are placed over numbers imprinted on a bingo card when randomly-selected numbers are called out. Because bingo is an extremely popular game, improvements have been made in bingo chips and accessory items have been developed. Bingo chips can be transparent so that the player can see the number beneath the chip when verification of numbers on a winning card is required. Some bingo chips contain metallic elements so that they can be lifted from a bingo card or otherwise quickly collected by a magnetic wand. Frequently players will play with more than one bingo card at a time and a need has arisen for means to easily and quickly dispense bingo chips.

SUMMARY OF THE INVENTION

It is an object of this invention to provide a bingo chip dispenser whereby bingo chips can be easily dispensed one at a time by depressing a knob on the device when the device is placed over the numbered square to be covered on the bingo card. The device of this invention avoids the necessity of having to pick up a single chip from a collection of chips spread over an area. The convenience of having a bingo chip dispenser allows a player to concentrate on the numbers being called. To utilize this device, one merely places the nozzle of the device over the square displaying the number called, depresses the knob and the device dispenses a single bingo chip over that spot.

It is a further object of this invention to allow a plurality of chips to be easily dispensed one at a time from a device held and operated in one hand.

It is a further object of this invention for such device to be reusable, having a detachable cartridge which can be refilled with chips. A player can utilize the device until all of the chips have been dispensed from the cartridge and then merely detach the spent cartridge, attach a chip-filled cartridge and continue playing without any significant interruption.

The device of this invention includes a body member having a chip deposit nozzle disposed at the bottom extending downward, such nozzle having a diameter slightly greater than the diameter of the bingo chip to be dispensed so that the chips can pass therethrough. The body member has a cartridge receipt area on its top into which a cartridge can be engaged, the cartridge being cylindrical and containing a stack of bingo chips therein which can be preloaded thereinto by a funnel or other means. The cartridge is disposed extending above the body member directionally aligned, but with its central axis offset somewhat, with the central axis of the nozzle below. A sliding plunger member having a chip receipt slot formed between two arm members is disposed in a first position in the body member beneath the cartridge so as to receive a single one of the chips in the slide member's chip receipt slot. In use one depresses the knob which moves the sliding plunger and its arms which define the chip receipt slot formed therebetween forward which action moves the chip that is then held between the arm members to a point where the chip is directly over the deposit nozzle. The chip then falls by gravity through the deposit nozzle onto the bingo chip card where the chip is to be positioned.

DESCRIPTION OF THE PREFERRED EMBODIMENT(S)

Figure 1:
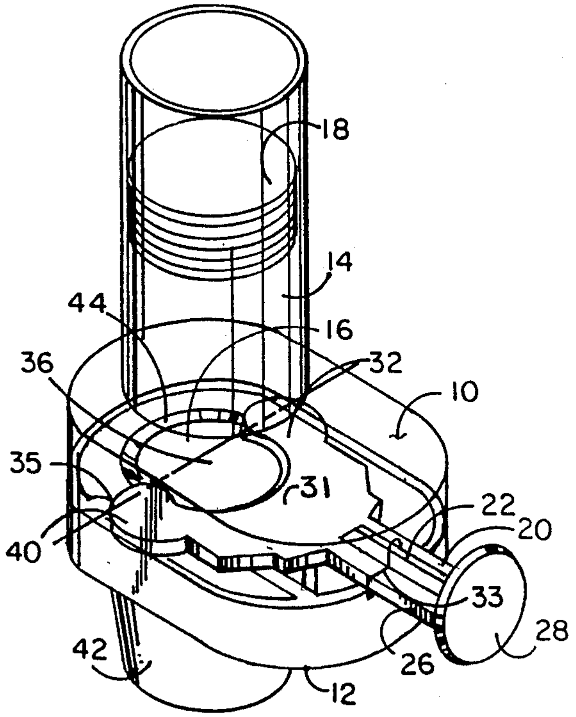
FIG. 1 illustrates a perspective view of the device of this invention.
Figure 2:
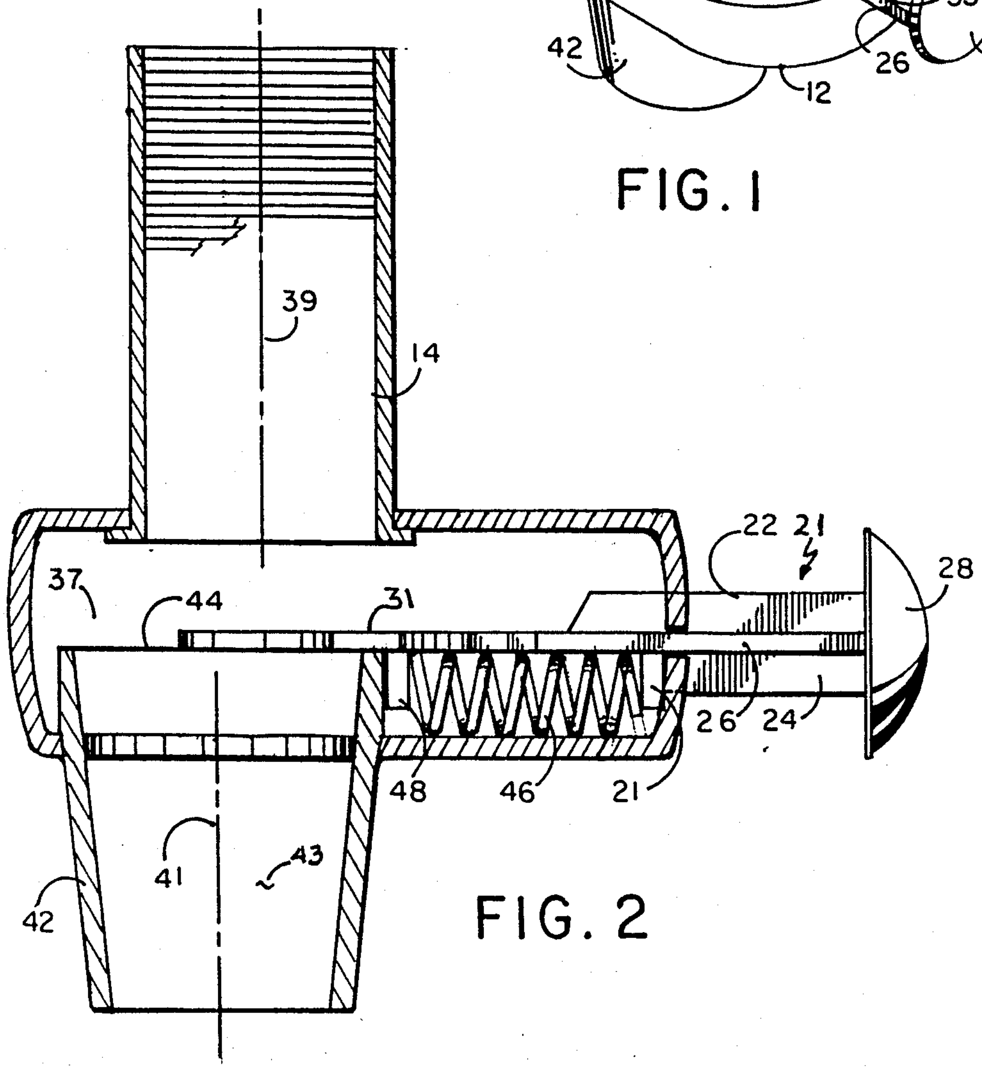
FIG. 2 illustrates a side cutaway view through the device of this invention.
Figure 3:
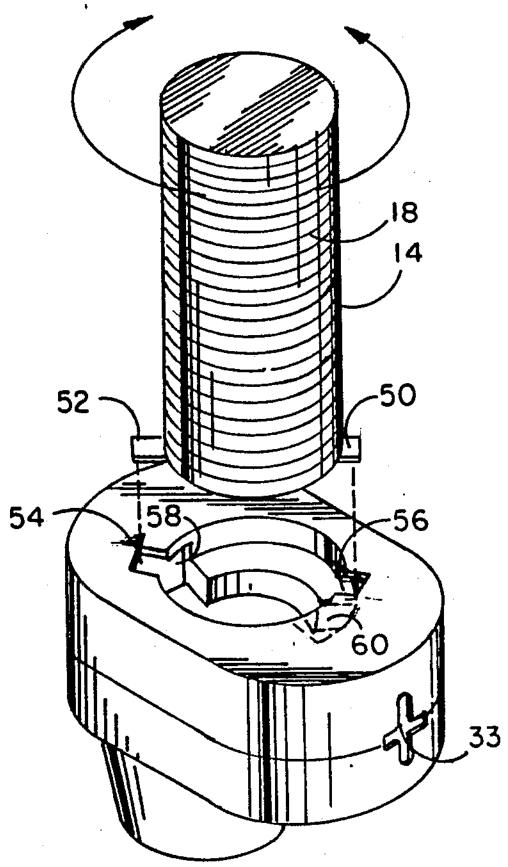
FIG. 3 illustrates a perspective view of the top of this invention showing the cartridge detached from the body member of the device.

FIG. 1 illustrates a perspective view of the device of this invention with portions of the body member being depicted transparent so that the internal structure of the device can be seen. In practice, though, the device need not be composed of transparent material although the cartridge or a portion thereof may be transparent to show the amount of chips that are contained therein. Basically the body member consists of two parts: base 12 and upper cap member 10. Within these parts is contained a movable sliding plunger member having slide member 31 which extends to a pair of spaced-apart first and second arm extensions 32 and 40. First and second arm extensions 32 and 40 curve around forming chip receipt slot 36 therebetween which is an open-ended circular opening to receive chip 18 therein between first and second arm extensions 32 and 40. First and second arm extensions 32 and 40 extend around the chip beyond its midline so as to substantially enclose the chip to prevent any undesired lateral movement of the chip until the device is manually actuated by the user. Cartridge 14, containing a plurality of stacked chips 18, is attached to body cap 10 as depicted in FIG. 3. The attachment means can be by screw thread or by projection members engaging into undercut portions in the body cap such as will be described below but such means enabling cartridge 14 to be quickly removable and reattachable to body cap 10. Cartridge 14 can be refilled by inserting more chips into it once it has been detached from body cap 10. A funnel can be used for such refilling procedure. Body member 12 has deposit nozzle 42 on the bottom thereof which nozzle has a deposit nozzle aperture 43 disposed therethrough with a chip rest surface 44 formed by the top of the sides of deposit nozzle 42. It is on this chip rest surface 44 that slide member 31 rests and when it receives a chip 18 from cartridge 14 within chip receipt slot 36, it holds that chip with portions of the chip resting on the portion of the chip rest surface 44 that is beneath slide member 31 and under cartridge receipt area 16. The chip cannot move forward at all because it is retained by portions of first and second arm extensions 32 and 40 which extend beyond the midpoint of the chip. In this way the chip cannot fall laterally into deposit nozzle 42. Deposit nozzle 42 is located within the body member as seen in FIG. 2 with its central axis 41 somewhat offset from the central axis 39 of cartridge 14 so that the chips do not fall directly from cartridge 14 through deposit nozzle 42 but first rest upon chip rest surface 44 further held between first and second arm extensions 32 and 40 until slide member 31 is moved forward by knob 28. Once it is moved forward, the chip is moved over deposit nozzle aperture 43 as seen in FIG. 2 and falls directly through deposit nozzle 42 onto the numbered space on the bingo card which card is not depicted but which card is well known in the art. By placing deposit nozzle 42 over the numbered space, the device of this invention will deposit one chip thereon when actuated by the user. Slide member 31 is returned to its first position by spring 46 which urges against an exterior portion of the deposit nozzle at spring stop 48. Spring 46 extends rearward to slide spring stop member 21 which is disposed on the bottom of slide member 31. Spring 46 being under tension always urges between spring stop 48 and slide spring stop 21 thereby urging slide member 31 always rearward to its first position to receive a chip from cartridge 14. When desired, the user pushes knob 28 and slide member 31 moves forward carrying within its chip receipt slot 36 a single chip to a second position over the offset deposit nozzle 42 when that chip falls out of chip receipt slot 36 through deposit nozzle aperture 43 and onto the bingo card.

FIG. 3 illustrates one method of attaching cartridge 14 to body cap 10 whereby the cartridge has a first cartridge projection 50 and a second cartridge projection 52 which engage into first projection receipt slot 54 and a second projection receipt slot 56 on top of cap member 10. Undercut within cap member 10 are first and second projection receipt areas 58 and 60 into which the first and second cartridge projections 50 and 52 can be rotated under a portion of cap member 10, thereby retaining cartridge 14 in position. When one wishes to remove the cartridge, one merely rotates it in the opposite direction until first and second cartridge projections 50 and 52 are again within first and second projection receipt slots 54 and 56 and one can lift the cartridge out of the cap member for refilling or to insert a new cartridge. Other equivalent methods of releasably attaching the cartridge to cap member 10 can be utilized such as screw threads but such methods should not only hold the cartridge securely but also allow for quick and easy removal thereof during use. In order to allow slide member 31 to move easily and directly from under cartridge receipt area 16 to a position over deposit nozzle aperture 43, a series of guide members on slide 31 can be provided to pass through guide slot 33 formed between base 12 and cap member 10. The sides of slide member 31 can form right horizontal glide member 20 and left horizontal glide member 26 which pass within the corresponding portions of guide slot 33. Top vertical slide guide 22 can be disposed centrally located on the top face of slide member 31. Bottom vertical slide guide 24 can also be centrally located on the bottom of slide member 31 in order to prevent slide projection 21 from becoming misaligned and to help direct its alignment under cartridge 14 in its first position and when moved to its second position, to be disposed directly over deposit nozzle aperture 43. In this manner one can place a large plurality of chips 18 within the cartridge, depress knob 28 moving slide member 31 forward thereby compressing spring 46 between spring stop 48 and slide spring stop member 21 and forcefully moving the single chip that is held within chip receipt slot 36 between first and second arm extensions 32 and 40 over deposit nozzle aperture 43 where the chip will fall from chip receipt slot 36 through deposit nozzle aperture 43 onto the bingo card. It should be noted that the area at which the arms and slide member receive the chip is generally of the same thickness as the thickness of a single chip and the slide passage area defined within the body member through which the arms pass will only accommodate a single chip to pass within the slide movement area 37 so as to prevent multiple chips from passing from cartridge 14 or otherwise making their way through to deposit nozzle aperture 43. In this manner a single chip is maneuvered one at a time for deposit onto the bingo card as desired by the user of the device of this invention.

Although the present invention has been described with reference to particular embodiments, it will be apparent to those skilled in the art that variations and modifications can be substituted therefor without departing from the principles and spirit of the invention.

I claim:

1. A bingo chip dispensing device comprising:

a body member having a top, bottom and sides with a cartridge attachment area at the top thereof with an aperture defined within said cartridge attachment area of said body member, said aperture being of a size greater than that of said bingo chip;

a slide movement area defined within said body member having a first and second portion, the first portion of which being located under said cartridge attachment area aperture;

a deposit nozzle positioned on the bottom of said body member, said deposit nozzle having a deposit aperture defined therein, said deposit aperture extending into said body member to said second portion of said slide movement area, said deposit nozzle aperture being larger than the size of a bingo chip and the central axis of said deposit nozzle aperture being offset from the central axis of said cartridge attachment area aperture;

a slide member having at one end thereof first and second curved arms defining a chip receipt slot therebetween, said slide member being positioned in said slide movement area and adapted to be moved from a first position beneath said cartridge attachment area aperture to a second position in said slide movement area above said deposit nozzle aperture;

a hollow cylindrical cartridge adapted to contain a stack of bingo chips, said cartridge including means to releasably attach it to the top of said body member above said aperture in said cartridge attachment area whereby when said chips are contained within said cartridge, they pass through said cartridge attachment area aperture into said chip receipt slot defined between said first and second arms of said slide member and further so that when said slide member is moved to said second position over said deposit nozzle aperture, a chip falls from said chip receipt slot through said deposit nozzle aperture onto the place the user wishes to dispense said chip, said deposit nozzle extending within said body member to a point directly beneath said slide member within said slide movement area forming an upper chip rest surface at its top for said chip to rest upon when it is in said slide member's chip receipt slot in said slide member's first position, said first and second arm members extending around said chip receipt slot beyond the midpoint of said chip so as to retain said chip within said arms to prevent any independent lateral movement of said chip apart from movement while it is held within said slide member;

a slide projection slot defined in the side of said body member;

a slide projection member extending from the opposite side of said slide member from said first and second arms out of said body member through said slide projection slot providing means for the manual movement of said projection member to move said slide member from its first position to its second position within said slide movement area in said body member;

means to urge said slide member to said first position including:

a slide spring stop member positioned on the base of said slide member adapted to move within said body member;

a spring stop member positioned on the upper exterior portion of said deposit nozzle; and a spring member extending between said slide spring stop and said spring stop member to urge said slide member to said first position.

2. The device of claim 1 further including first guide means on said slide projection member and mating second guide means on said slide projection slot adapted to cause said slide member to only be able to move from said first position to said second position and back.

3. The device of claim 2 wherein said releasable attachment means of said cartridge comprises a pair of projections extending from said cartridge and corresponding receipt slots defined on the top of said body member having undercut portions defined in said body member around said cartridge attachment area whereby said projections on said cartridge, once inserted into said projection slots in said body member, can be moved by rotation of said cartridge to hold said cartridge to said body member by the portions of the body member over said cartridge projections and when said cartridge is rotated in the opposite direction, to release said cartridge from said body member by realigning said cartridge projections in the receipt slots so that said cartridge can be released and removed from said body member for reloading.

* * * * *